US012451147B2

(12) United States Patent
Pihlajakuja et al.

(10) Patent No.: US 12,451,147 B2
(45) Date of Patent: Oct. 21, 2025

(54) SPATIAL AUDIO PARAMETER ENCODING AND ASSOCIATED DECODING

(71) Applicant: Nokia Technologies Oy, Espoo (FI)

(72) Inventors: Tapani Pihlajakuja, Kellokoski (FI); Adriana Vasilache, Tampere (FI); Mikko-Ville Laitinen, Espoo (FI); Anssi Rämö, Tampere (FI); Lasse Laaksonen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 506 days.

(21) Appl. No.: 17/788,155

(22) PCT Filed: Dec. 11, 2020

(86) PCT No.: PCT/FI2020/050831
§ 371 (c)(1),
(2) Date: Jun. 22, 2022

(87) PCT Pub. No.: WO2021/136879
PCT Pub. Date: Jul. 8, 2021

(65) Prior Publication Data

US 2023/0335141 A1 Oct. 19, 2023

(30) Foreign Application Priority Data

Dec. 31, 2019 (GB) ...................................... 1919452

(51) Int. Cl.
*G10L 19/008* (2013.01)
*G10L 19/032* (2013.01)

(52) U.S. Cl.
CPC .......... *G10L 19/008* (2013.01); *G10L 19/032* (2013.01)

(58) Field of Classification Search
CPC ....... G10L 19/00; G10L 19/18; G10L 19/002; G10L 19/02; G10L 19/0204;
(Continued)

(56) References Cited

U.S. PATENT DOCUMENTS

| | | | | |
|---|---|---|---|---|
| 2009/0198356 A1* | 8/2009 | Goodwin | G10L 19/008 | 700/94 |
| 2019/0132674 A1* | 5/2019 | Vilkamo | G10L 25/18 | |
| 2020/0265851 A1* | 8/2020 | Fuchs | G10L 19/008 | |

FOREIGN PATENT DOCUMENTS

| | | |
|---|---|---|
| GB | 2549532 A | 10/2017 |
| GB | 2574238 A | 12/2019 |

(Continued)

OTHER PUBLICATIONS

"Proposal for MASA common metadata and metadata structure", 3GPP TSG-SA4#101 meeting, S4 (18)1353, Agenda: 7.5, Nokia Corporation, Nov. 19-23, 2018, pp. 1-4.

(Continued)

*Primary Examiner* — Leshui Zhang
(74) *Attorney, Agent, or Firm* — ALSTON & BIRD LLP

(57) ABSTRACT

An apparatus comprising means configured to: obtain at least one parameter value (106) associated with at least two time-frequency parts of at least one audio signal (104); obtain at least one similarity value based on the at least one parameter value (106) associated with the at least two time-frequency parts of at least one audio signal (104); determine at least one group of time-frequency parts from the at least two time-frequency parts of at least one audio signal (104), the at least one group of time-frequency parts based on the at least one similarity value; and generate for the at least one group of time-frequency parts at least one associated group parameter (204), the at least one group (Continued)

parameter (204) based on the at least one parameter value (106) associated with the time-frequency parts.

7 Claims, 9 Drawing Sheets

(58) Field of Classification Search
CPC ..... G10L 19/012; G10L 19/08; G10L 19/008; G10L 19/032; G10L 19/167; G10L 19/16; G10L 19/0208; G10L 25/18; G10L 25/21; G10L 19/022; G10L 19/06; G10L 19/07; G10L 21/0388; G10L 25/06; G10L 19/20; G10L 21/038; G10L 19/265; G10L 21/0232; G10L 25/45; G10L 19/22; G10L 19/173; G10L 21/028; H04R 3/005; H04S 3/02; H04S 7/303; H04S 7/304; H04S 7/302; H04S 1/007
USPC ................... 704/500–504; 381/1–23; 700/94
See application file for complete search history.

(56) References Cited

FOREIGN PATENT DOCUMENTS

| | | | | |
|---|---|---|---|---|
| GB | 2590650 A | 7/2021 | | |
| GB | 2590651 A | 7/2021 | | |
| WO | 2007/040349 A1 | 4/2007 | | |
| WO | 2010/012478 A2 | 2/2010 | | |
| WO | WO-2017182714 A1 | * | 10/2017 | G10L 19/008 |
| WO | 2018/091776 A1 | 5/2018 | | |
| WO | 2019/086757 A1 | 5/2019 | | |
| WO | WO-2019097018 A1 | * | 5/2019 | G10L 19/00 |
| WO | 2019/234290 A1 | 12/2019 | | |
| WO | 2020/008105 A1 | 1/2020 | | |
| WO | 2020/070377 A1 | 4/2020 | | |
| WO | 2020/089510 A1 | 5/2020 | | |
| WO | 2020/193865 A1 | 10/2020 | | |

OTHER PUBLICATIONS

Search Report received for corresponding United Kingdom Patent Application No. 1919452.1, dated May 28, 2020, 3 pages.
International Search Report and Written Opinion received for corresponding Patent Cooperation Treaty Application No. PCT/FI2020/050831, dated Apr. 6, 2021, 29 pages.
Yang et al., "Multi-channel Object-Based Spatial Parameter Compression Approach for 3D Audio", Advances in Multimedia Information Processing, 2015, pp. 354-364.
"Proposal for MASA format", 3GPP TSG-SA4#102 meeting, S4 (19)0121, Agenda: 7.5, Nokia Corporation, Jan. 28-Feb. 1, 2019, pp. 1-10.
Extended European Search Report received for corresponding European Patent Application No. 20908590.1, dated Jan. 17, 2024, 10 pages.

* cited by examiner

SPATIAL AUDIO PARAMETER ENCODING AND ASSOCIATED DECODING

RELATED APPLICATION

This application was originally filed as PCT Application No. PCT/FI2020/050831, filed on Dec. 11, 2020, which claims priority from GB Application No. 1919452.1, filed on Dec. 31, 2019, each of which is incorporated herein by reference in its entirety.

FIELD

The present application relates to apparatus and methods for sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of directional metadata parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directional metadata such as directions and direct-to-total energy ratios in frequency bands are thus a parameterization that is particularly effective for spatial audio capture.

A directional metadata parameter set consisting of one or more direction value for each frequency band and an energy ratio parameter associated with each direction value can be also utilized as spatial metadata (which may also include other parameters such as spread coherence, number of directions, distance, etc.) for an audio codec. The directional metadata parameter set may also comprise other parameters or may be associated with other parameters which are considered to be non-directional (such as surround coherence, diffuse-to-total energy ratio, remainder-to-total energy ratio). For example, these parameters can be estimated from microphone-array captured audio signals, and for example a stereo signal can be generated from the microphone array signals to be conveyed with the spatial metadata.

As some codecs are expected to operate at various bit rates ranging from very low bit rates to relatively high bit rates, various strategies are needed for the compression of the spatial metadata to optimize the codec performance for each operating point. The raw bitrate of the encoded parameters (metadata) is relatively high, so especially at lower bitrates it is expected that only the most important parts of the metadata can be conveyed from the encoder to the decoder.

A decoder can decode the audio signals into PCM signals and process the sound in frequency bands (using the spatial metadata) to obtain the spatial output, for example a binaural output.

The aforementioned solution is particularly suitable for encoding captured spatial sound from microphone arrays (e.g., in mobile phones, video cameras, VR cameras, standalone microphone arrays). However, it may be desirable for such an encoder to have also other input types than microphone-array captured signals, for example, loudspeaker signals, audio object signals, or Ambisonics signals.

SUMMARY

There is provided according to a first aspect an apparatus comprising means configured to: obtain at least one parameter value associated with at least two time-frequency parts of at least one audio signal; obtain at least one similarity value based on the at least one parameter value associated with the at least two time-frequency parts of at least one audio signal; determine at least one group of time-frequency parts from the at least two time-frequency parts of at least one audio signal, the at least one group of time-frequency parts based on the at least one similarity value; and generate for the at least one group of time-frequency parts at least one associated group parameter, the at least one group parameter based on the at least one parameter value associated with the time-frequency parts.

The means configured to obtain at least one similarity value associated with the at two time-frequency parts of at least one audio signal may be configured to determine a similarity decision matrix.

The at least one parameter value may comprise at least one direction and at least one direct-to-total ratio associated with the at least one direction, and the means configured to determine a similarity decision matrix may be configured to determine a weighted direction vector for each time-frequency part based on the at least one direction and the at least one direct-to-total ratio associated with the at least one direction.

The means configured to determine at least one group of time-frequency parts from the at least two time-frequency parts of at least one audio signal may be configured to determine a frequency weighting for restricting group selection such that determined groups contain time-frequency parts that are within a defined frequency band distance.

The means configured to determine at least one group of time-frequency parts from the at least two time-frequency parts of at least one audio signal may be configured to determine an ordered list of time-frequency parts from which the at least one group of time-frequency parts from the at least two time-frequency parts of at least one audio signal are selected, wherein the ordered list may be based on a descending order of directive energy of the time-frequency parts.

The means configured to determine at least one group of time-frequency parts from the at least two time-frequency parts of at least one audio signal may be configured to determine a defined number of groups.

The at least one group may comprise at least two groups and the means may be further configured to combine at least two of the groups of time-frequency parts based on the associated group parameters being substantially similar.

The means may be further configured to generate at least one indicator configured to identify group members of the at least one group.

The means configured to generate at least one indicator configured to identify group members of the at least one group may be configured to generate one of: signalling bits for signalling group members, the signalling bits based on a number of frequency bands, a number of subframes and the index of the group; and compressed signalling bits for signalling group members, the signalling bits based on a number of frequency bands, a number of subframes and the index of the group, wherein the number of groups may be restricted and the compressed signalling bits may comprise downsampled group data.

The at least one parameter value may comprise at least two directions for each time-frequency part and at least two direct-to-total ratio each associated with one of the at least two directions, and the means configured to determine at least one group of time-frequency parts from the at least two time-frequency parts of at least one audio signal, the at least one group of time-frequency parts based on the at least one similarity value may be configured to: determine at least one group of time-frequency parts from the at least two time-frequency parts of at least one audio signal for each of the at least two directions; and adaptively reduce the number of directions for each time-frequency part.

The means configured to obtain at least one similarity value based on the at least one parameter value associated with the at least two time-frequency parts of at least one audio signal may be configured to obtain similarity values over more than one parameter value for each time-frequency part.

The means may be further configured to quantize the at least one associated group parameter.

The means may be further configured to combine any groups of time-frequency parts based on the quantized associated group parameters being substantially similar.

The means may be further configured to split into group parts the generated at least one group of time-frequency parts such that each of the group parts have associated group part parameters.

The means configured to obtain at least one parameter value associated with at least two time-frequency parts of at least one audio signal may be configured to obtain at least one of: at least one direction value; at least one direct-to-total ratio associated with at least one direction value; at least one spread coherence associated with at least one direction value; at least one distance associated with at least one direction value; at least one surround coherence; at least one diffuse-to-total ratio; and at least one remainder-to-total ratio.

According to a second aspect there is provided an apparatus comprising means configured to: obtain at least one encoded bitstream comprising at least one associated group parameter for at least one group of at least one time-frequency part and at least one indicator configured to identify one or more group member of the at least one group; extract from the at least one associated group parameter for the at least one group of the at least one time-frequency part and the at least one indicator configured to identify one or more group member of the at least one group at least one parameter value associated with at least one time-frequency part of at least one audio signal.

The means configured to extract from the at least one associated group parameter for the at least one group of the at least one time-frequency part and the at least one indicator configured to identify one or more group member of the at least one group at least one parameter value associated with at least one time-frequency part of at least one audio signal is configured to copy the associated group parameter to be a parameter for each time-frequency part of at least one audio 15 signal for the one or more group member of the at least one group.

According to a third aspect there is provided a method comprising: obtaining at least one parameter value associated with at least two time-frequency parts of at least one audio signal; obtaining at least one similarity value based on the at least one parameter value associated with the at least two time-frequency parts of at least one audio signal; determining at least one group of time-frequency parts from the at least two time-frequency parts of at least one audio signal, the at least one group of time-frequency parts based on the at least one similarity value; and generating for the at least one group of time-frequency parts at least one associated group parameter, the at least one group parameter based on the at least one parameter value associated with the time-frequency parts.

Obtaining at least one similarity value associated with the at two time-frequency parts of at least one audio signal may comprise determining a similarity decision matrix.

The at least one parameter value may comprise at least one direction and at least one direct-to-total ratio associated with the at least one direction, and Determining a similarity decision matrix may comprise determining a weighted direction vector for each time-frequency part based on the at least one direction and the at least one direct-to-total ratio associated with the at least one direction.

Determining at least one group of time-frequency parts from the at least two time-frequency parts of at least one audio signal may comprise determining a frequency weighting for restricting group selection such that determined groups contain time-frequency parts that are within a defined frequency band distance.

Determining at least one group of time-frequency parts from the at least two time-frequency parts of at least one audio signal may comprise determining an ordered list of time-frequency parts from which the at least one group of time-frequency parts from the at least two time-frequency parts of at least one audio signal are selected, wherein the ordered list may be based on a descending order of directive energy of the time-frequency parts.

Determining at least one group of time-frequency parts from the at least two time-frequency parts of at least one audio signal may comprise determining a defined number of groups.

The at least one group may comprise at least two groups and the method may further comprise combining at least two of the groups of time-frequency parts based on the associated group parameters being substantially similar.

The method may further comprise generating at least one indicator configured to identify group members of the at least one group.

Generating at least one indicator configured to identify group members of the at least one group may comprise generating one of: signalling bits for signalling group members, the signalling bits based on a number of frequency bands, a number of subframes and the index of the group; and compressed signalling bits for signalling group members, the signalling bits based on a number of frequency bands, a number of subframes and the index of the group, wherein the number of groups may be restricted and the compressed signalling bits may comprise downsampled group data.

The at least one parameter value may comprise at least two directions for each time-frequency part and at least two direct-to-total ratio each associated with one of the at least two directions, and determining at least one group of time-frequency parts from the at least two time-frequency parts of at least one audio signal, the at least one group of time-frequency parts based on the at least one similarity value may comprise: determining at least one group of time-frequency parts from the at least two time-frequency parts of at least one audio signal for each of the at least two directions; and adaptively reduce the number of directions for each time-frequency part.

Obtaining at least one similarity value based on the at least one parameter value associated with the at least two time-frequency parts of at least one audio signal may comprise obtaining similarity values over more than one parameter value for each time-frequency part.

The method may further comprise quantizing the at least one associated group parameter.

The method may further comprise combining any groups of time-frequency parts based on the quantized associated group parameters being substantially similar.

The method may further comprise splitting into group parts the generated at least one group of time-frequency parts such that each of the group parts have associated group part parameters.

Obtaining at least one parameter value associated with at least two time-frequency parts of at least one audio signal may comprise obtaining at least one of: at least one direction value; at least one direct-to-total ratio associated with at least one direction value; at least one spread coherence associated with at least one direction value; at least one distance associated with at least one direction value; at least one surround coherence; at least one diffuse-to-total ratio; and at least one remainder-to-total ratio.

According to a fourth aspect there is provided a method comprising: obtaining at least one encoded bitstream comprising at least one associated group parameter for at least one group of at least one time-frequency part and at least one indicator configured to identify one or more group member of the at least one group; extracting from the at least one associated group parameter for the at least one group of the at least one time-frequency part and the at least one indicator configured to identify one or more group member of the at least one group at least one parameter value associated with at least one time-frequency part of at least one audio signal.

Extracting from the at least one associated group parameter for the at least one group of the at least one time-frequency part and the at least one indicator configured to identify one or more group member of the at least one group at least one parameter value associated with at least one time-frequency part of at least one audio signal may comprise copying the associated group parameter to be a parameter for each time-frequency part of at least one audio signal for the one or more group member of the at least one group.

According to a fifth aspect there is provided an apparatus comprising at least one processor and at least one memory including a computer program code, the at least one memory and the computer program code configured to, with the at least one processor, cause the apparatus at least to: obtain at least one parameter value associated with at least two time-frequency parts of at least one audio signal; obtain at least one similarity value based on the at least one parameter value associated with the at least two time-frequency parts of at least one audio signal; determine at least one group of time-frequency parts from the at least two time-frequency parts of at least one audio signal, the at least one group of time-frequency parts based on the at least one similarity value; and generate for the at least one group of time-frequency parts at least one associated group parameter, the at least one group parameter based on the at least one parameter value associated with the time-frequency parts.

The apparatus caused to obtain at least one similarity value associated with the at two time-frequency parts of at least one audio signal may be caused to determine a similarity decision matrix.

The at least one parameter value may comprise at least one direction and at least one direct-to-total ratio associated with the at least one direction, and the apparatus caused to determine a similarity decision matrix may be caused to determine a weighted direction vector for each time-frequency part based on the at least one direction and the at least one direct-to-total ratio associated with the at least one direction.

The apparatus caused to determine at least one group of time-frequency parts from the at least two time-frequency parts of at least one audio signal may be caused to determine a frequency weighting for restricting group selection such that determined groups contain time-frequency parts that are within a defined frequency band distance.

The apparatus caused to determine at least one group of time-frequency parts from the at least two time-frequency parts of at least one audio signal may be caused to determine an ordered list of time-frequency parts from which the at least one group of time-frequency parts from the at least two time-frequency parts of at least one audio signal are selected, wherein the ordered list may be based on a descending order of directive energy of the time-frequency parts.

The apparatus caused to determine at least one group of time-frequency parts from the at least two time-frequency parts of at least one audio signal may be caused to determine a defined number of groups.

The at least one group may comprise at least two groups and the apparatus caused to combine at least two of the groups of time-frequency parts based on the associated group parameters being substantially similar.

The apparatus may be caused to generate at least one indicator configured to identify group members of the at least one group.

The apparatus caused to generate at least one indicator configured to identify group members of the at least one group may be caused to generate one of: signalling bits for signalling group members, the signalling bits based on a number of frequency bands, a number of subframes and the index of the group; and compressed signalling bits for signalling group members, the signalling bits based on a number of frequency bands, a number of subframes and the index of the group, wherein the number of groups may be restricted and the compressed signalling bits may comprise downsampled group data.

The at least one parameter value may comprise at least two directions for each time-frequency part and at least two direct-to-total ratio each associated with one of the at least two directions, and the apparatus caused to determine at least one group of time-frequency parts from the at least two time-frequency parts of at least one audio signal, the at least one group of time-frequency parts based on the at least one similarity value may be caused to: determine at least one group of time-frequency parts from the at least two time-frequency parts of at least one audio signal for each of the at least two directions; and adaptively reduce the number of directions for each time-frequency part.

The apparatus caused to obtain at least one similarity value based on the at least one parameter value associated with the at least two time-frequency parts of at least one audio signal may be caused to obtain similarity values over more than one parameter value for each time-frequency part.

The apparatus may be further caused to quantize the at least one associated group parameter.

The apparatus may be further caused to combine any groups of time-frequency parts based on the quantized associated group parameters being substantially similar.

The apparatus may be further caused to split into group parts the generated at least one group of time-frequency parts such that each of the group parts have associated group part parameters.

The apparatus caused to obtain at least one parameter value associated with at least two time-frequency parts of at least one audio signal may be caused to obtain at least one of: at least one direction value; at least one direct-to-total ratio associated with at least one direction value; at least one spread coherence associated with at least one direction value; at least one distance associated with at least one direction value; at least one surround coherence; at least one diffuse-to-total ratio; and at least one remainder-to-total ratio.

According to a sixth aspect there is provided an apparatus comprising at least one processor and at least one memory including a computer program code, the at least one memory and the computer program code configured to, with the at least one processor, cause the apparatus at least to: obtain at least one encoded bitstream comprising at least one associated group parameter for at least one group of at least one time-frequency part and at least one indicator configured to identify one or more group member of the at least one group; extract from the at least one associated group parameter for the at least one group of the at least one time-frequency part and the at least one indicator configured to identify one or more group member of the at least one group at least one parameter value associated with at least one time-frequency part of at least one audio signal.

The apparatus caused to extract from the at least one associated group parameter for the at least one group of the at least one time-frequency part and the at least one indicator configured to identify one or more group member of the at least one group at least one parameter value associated with at least one time-frequency part of at least one audio signal is configured to copy the associated group parameter to be a parameter for each time-frequency part of at least one audio signal for the one or more group member of the at least one group.

According to a seventh aspect there is provided an apparatus comprising: means for obtaining at least one parameter value associated with at least two time-frequency parts of at least one audio signal; means for obtaining at least one similarity value based on the at least one parameter value associated with the at least two time-frequency parts of at least one audio signal; means for determining at least one group of time-frequency parts from the at least two time-frequency parts of at least one audio signal, the at least one group of time-frequency parts based on the at least one similarity value; and means for generating for the at least one group of time-frequency parts at least one associated group parameter, the at least one group parameter based on the at least one parameter value associated with the time-frequency parts.

According to an eighth aspect there is provided an apparatus comprising: means for obtaining at least one encoded bitstream comprising at least one associated group parameter for at least one group of at least one time-frequency part and at least one indicator configured to identify one or more group member of the at least one group; means for extracting from the at least one associated group parameter for the at least one group of the at least one time-frequency part and the at least one indicator configured to identify one or more group member of the at least one group at least one parameter value associated with at least one time-frequency part of at least one audio signal.

According to a ninth aspect there is provided a computer program comprising instructions [or a computer readable medium comprising program instructions] for causing an apparatus to perform at least the following: obtaining at least one parameter value associated with at least two time-frequency parts of at least one audio signal; obtaining at least one similarity value based on the at least one parameter value associated with the at least two time-frequency parts of at least one audio signal; determining at least one group of time-frequency parts from the at least two time-frequency parts of at least one audio signal, the at least one group of time-frequency parts based on the at least one similarity value; and generating for the at least one group of time-frequency parts at least one associated group parameter, the at least one group parameter based on the at least one parameter value associated with the time-frequency parts.

According to a tenth aspect there is provided a computer program comprising instructions [or a computer readable medium comprising program instructions] for causing an apparatus to perform at least the following: obtaining at least one encoded bitstream comprising at least one associated group parameter for at least one group of at least one time-frequency part and at least one indicator configured to identify one or more group member of the at least one group; extracting from the at least one associated group parameter for the at least one group of the at least one time-frequency part and the at least one indicator configured to identify one or more group member of the at least one group at least one parameter value associated with at least one time-frequency part of at least one audio signal.

According to an eleventh aspect there is provided a non-transitory computer readable medium comprising program instructions for causing an apparatus to perform at least the following: obtaining at least one parameter value associated with at least two time-frequency parts of at least one audio signal; obtaining at least one similarity value based on the at least one parameter value associated with the at least two time-frequency parts of at least one audio signal; determining at least one group of time-frequency parts from the at least two time-frequency parts of at least one audio signal, the at least one group of time-frequency parts based on the at least one similarity value; and generating for the at least one group of time-frequency parts at least one associated group parameter, the at least one group parameter based on the at least one parameter value associated with the time-frequency parts.

According to a twelfth aspect there is provided a non-transitory computer readable medium comprising program instructions for causing an apparatus to perform at least the following: obtaining at least one encoded bitstream comprising at least one associated group parameter for at least one group of at least one time-frequency part and at least one indicator configured to identify one or more group member of the at least one group; extracting from the at least one associated group parameter for the at least one group of the at least one time-frequency part and the at least one indicator configured to identify one or more group member of the at least one group at least one parameter value associated with at least one time-frequency part of at least one audio signal.

According to a thirteenth aspect there is provided an apparatus comprising: obtaining circuitry configured to obtain at least one parameter value associated with at least two time-frequency parts of at least one audio signal; obtaining circuitry configured to obtain at least one similarity value based on the at least one parameter value associated with the at least two time-frequency parts of at least one audio signal; determining circuitry configured to determine at least one group of time-frequency parts from the at least two time-frequency parts of at least one audio signal, the at least one group of time-frequency parts based on the at least one similarity value; and generating circuitry configured to generate for the at least one group of time-frequency parts at least one associated group parameter, the at least one group parameter based on the at least one parameter value associated with the time-frequency parts.

According to a fourteenth aspect there is provided an apparatus comprising: obtaining circuitry configured to obtain at least one encoded bitstream comprising at least one associated group parameter for at least one group of at least one time-frequency part and at least one indicator configured to identify one or more group member of the at least one group; extracting circuitry configured to extract from the at least one associated group parameter for the at least one group of the at least one time-frequency part and the at least one indicator configured to identify one or more group member of the at least one group at least one parameter value associated with at least one time-frequency part of at least one audio signal.

According to a fifteenth aspect there is provided a computer readable medium comprising program instructions for causing an apparatus to perform at least the following: obtaining at least one parameter value associated with at least two time-frequency parts of at least one audio signal; obtaining at least one similarity value based on the at least one parameter value associated with the at least two time-frequency parts of at least one audio signal; determining at least one group of time-frequency parts from the at least two time-frequency parts of at least one audio signal, the at least one group of time-frequency parts based on the at least one similarity value; and generating for the at least one group of time-frequency parts at least one associated group parameter, the at least one group parameter based on the at least one parameter value associated with the time-frequency parts.

According to a sixteenth aspect there is provided a computer readable medium comprising program instructions for causing an apparatus to perform at least the following: obtaining at least one encoded bitstream comprising at least one associated group parameter for at least one group of at least one time-frequency part and at least one indicator configured to identify one or more group member of the at least one group; extracting from the at least one associated group parameter for the at least one group of the at least one time-frequency part and the at least one indicator configured to identify one or more group member of the at least one group at least one parameter value associated with at least one time-frequency part of at least one audio signal.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
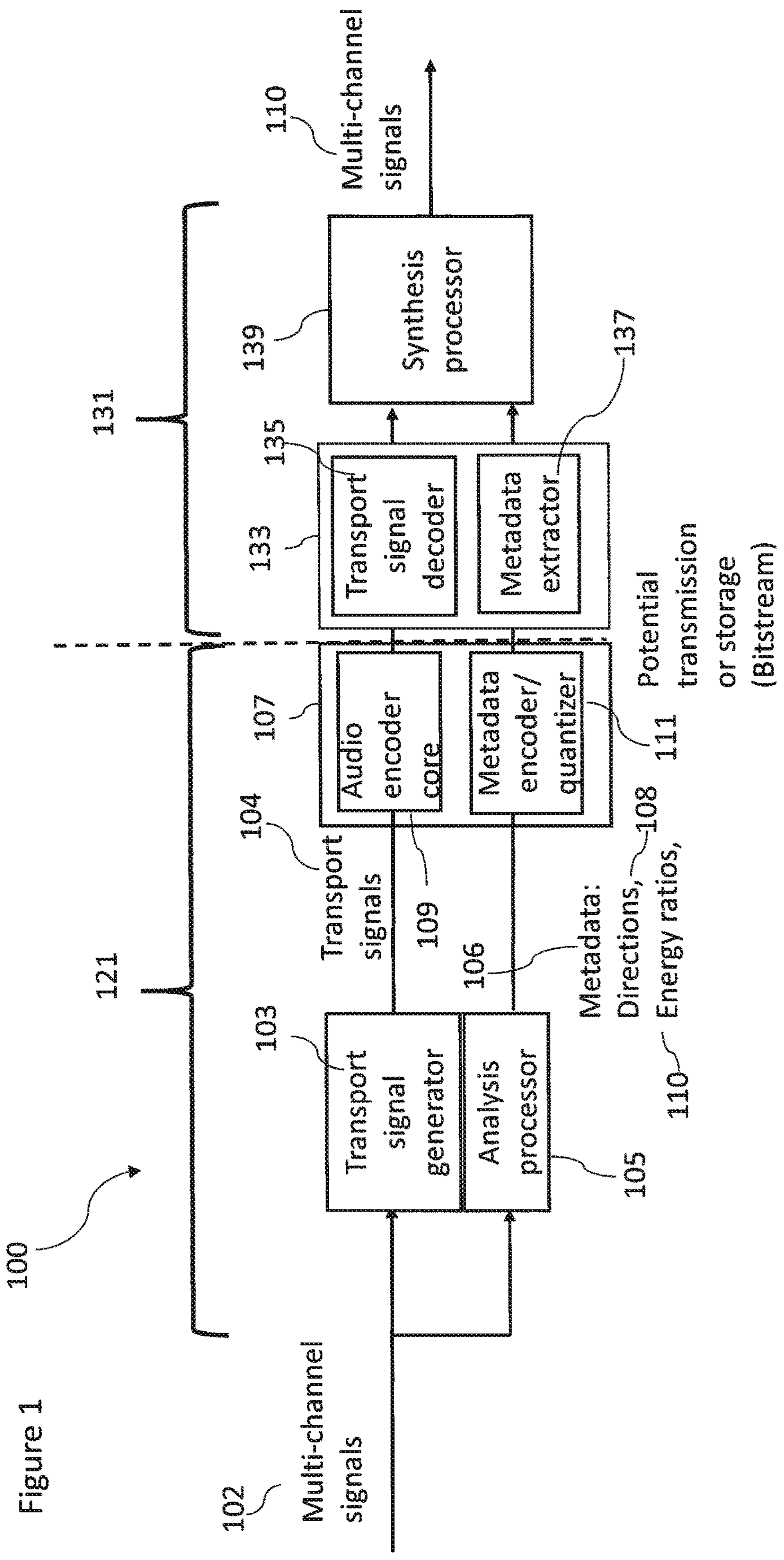
FIG. 1 shows schematically a system of apparatus suitable for implementing some embodiments.

The following describes in further detail suitable apparatus and possible mechanisms for the provision of combining and encoding spatial analysis derived metadata parameters. In the following discussions a multi-channel system is discussed with respect to a multi-channel microphone implementation. However as discussed above the input format may be any suitable input format, such as multi-channel loudspeaker, Ambisonics (FOA/HOA) etc. It is understood that in some embodiments the channel location is based on a location of the microphone or is a virtual location or direction.

Furthermore in the following examples the output of the example system is a multi-channel loudspeaker arrangement. In other embodiments the output may be rendered to the user via means other than loudspeakers. The multi-channel loudspeaker signals may be also generalised to be two or more playback audio signals.

As discussed above directional metadata associated with the audio signals may comprise multiple parameters (such as multiple directions, and associated with each direction a direct-to-total ratio, distance, etc.) per time-frequency tile. The directional metadata may also comprise other parameters or may be associated with other parameters which are considered to be non-directional (such as surround coherence, diffuse-to-total energy ratio, remainder-to-total energy ratio) but when combined with the directional parameters are able to be used to define the characteristics of the audio scene. For example a reasonable design choice which is able to produce a good quality output is one where the directional metadata comprises two directions for each time-frequency subframe (and associated with each direction direct-to-total ratios, distance values etc) are determined. However as also discussed above, bandwidth and/or storage limitations may require a codec not to send directional metadata parameter values for each frequency band and temporal sub-frame.

Instead, some parameter values are merged (for example although multiple directions per time-frequency tile can be determined only 1 or a reduced number of directions for each time-frequency tile may be sent and/or the same direction(s) for multiple frequency bands and/or temporal sub-frames are sent). In the following examples the merging of directional metadata is discussed in detail with respect to the direction parameters. However the other components of the directional metadata can be similarly 'merged' or 'compressed' by using similar similarity values to identify the groups of the direction parameters to be 'compressed' or 'merged'.

The selection of these directional metadata parameters for merging can be determined based on at least one importance parameter controlling an adaptive merging of directional metadata parameters as described in UKIPO patent applications 1919130.3 and 1919131.1. In such a scheme separate directional metadata values for two time-frequency tiles or combined directional metadata values are selected based on the determined importance factor or parameter.

The embodiments as discussed herein further describe and discuss how the two frequency bands should be selected and where to inspect whether to combine the data or not. Furthermore in some embodiments this selection can be extended to all dimensions (for example time selection and time and frequency selection) at the same time.

These embodiments may be effective at lower bitrates where only a few bits can be used for signalling the combining and may be able to further utilize redundancy in the metadata. In other words these embodiments may reduce perceptual redundancy on all bitrates and may also be suitable for lower bitrates applications as well.

The concept as discussed within the embodiments hereafter relates to encoding of spatial audio streams with transport audio signals and (spatial) directional metadata where apparatus and methods are described that analyse time-frequency-based directional metadata and determine suitable groupings which can be signalled and may be used to reduce the number of directional metadata parameters stored/transmitted. In these embodiments this is achieved by analysing the perceptual similarity of directional metadata for each time-frequency part (TF-tile) compared to other time-frequency parts (TF-tiles) using a suitably determined importance parameter. The embodiments further describe forming groups of these time-frequency parts (TF-tiles) with perceptually similar directional metadata, combining the directional metadata representations (in other words the direction, direct-to-total, distance values etc) within each group into a single set of directional metadata parameters, and signalling the group information and group directional metadata.

In some embodiments the apparatus and methods can be further extended for directional metadata containing multiple directions per time-frequency part (TF-tile).

In some embodiments grouping the directional metadata is not signalled but the grouping method is used as a lossy (but perceptually lossless) information reduction pre-processing step.

In some further embodiments, the apparatus and methods may further implement quantization to obtain even more reductions when the quantized directional metadata parameter values for the groups are close to each other.

In some embodiments, the grouped directional metadata can be furthermore split into smaller sub-groups when the bitrate allows it and/or parameter error is considered too significant. In this case, a directional metadata parameter is selected and based on the non-combined value of it in for each TF-tile in the group members, the group members are divided into two groups. For example, in some embodiments, the group members are divided into two separate groups where a first group comprises group members with values less than the mean of the values and a second group comprising the remaining group members (the rest of the values).

In such embodiments there may be a general reduction of directional metadata with little or no quality deterioration.

With respect to FIG. 1 an example apparatus and system for implementing embodiments of the application are shown. The system 100 is shown with an 'analysis' part 121 and a 'synthesis' part 131. The 'analysis' part 121 is the part from receiving the multi-channel signals up to an encoding of the directional metadata and transport signal and the 'synthesis' part 131 is the part from a decoding of the encoded directional metadata and transport signal to the presentation of the re-generated signal (for example in multi-channel loudspeaker form).

In the following description the 'analysis' part 121 is described as a series of parts however in some embodiments the part may be implemented as functions within the same functional apparatus or part. In other words in some embodiments the 'analysis' part 121 is an encoder comprising at least one of the transport signal generator or analysis processor as described hereafter.

The input to the system 100 and the 'analysis' part 121 is the multi-channel signals 102. The 'analysis' part 121 may comprise a transport signal generator 103, analysis processor 105, and encoder 107. In the following examples a microphone channel signal input is described, however any suitable input (or synthetic multi-channel) format may be implemented in other embodiments. In such embodiments the directional metadata associated with the audio signals may be a provided to an encoder as a separate bit-stream. The multi-channel signals are passed to a transport signal generator 103 and to an analysis processor 105.

In some embodiments the transport signal generator 103 is configured to receive the multi-channel signals and generate a suitable audio signal format for encoding. The transport signal generator 103 can for example generate a stereo or mono audio signal. The transport audio signals generated by the transport signal generator can be any known format. For example when the input is one where the audio signals input are mobile phone microphone array audio signals, the transport signal generator 103 can be configured to select a left-right microphone pair, and apply any suitable processing to the audio signal pair, such as automatic gain control, microphone noise removal, wind noise removal, and equalization. In some embodiments when the input is a first order Ambisonic/higher order Ambisonic (FOA/HOA) signal, the transport signal generator can be configured to formulate directional beam signals towards left and right directions, such as two opposing cardioid signals. Additionally in some embodiments when the input is a loudspeaker surround mix and/or objects, then the transport signal generator 103 can be configured to generate a downmix signal that combines left side channels to a left downmix channel, combined right side channels to a right downmix channel and adds centre channels to both transport channels with a suitable gain.

In some embodiments the transport signal generator is bypassed (or in other words is optional). For example, in some situations where the analysis and synthesis occur at the same device at a single processing step, without intermediate processing there is no transport signal generation and the input audio signals are passed unprocessed. The number of transport channels generated can be any suitable number and not for example one or two channels.

The output of the transport signal generator 103 can be passed to an encoder 107.

In some embodiments the analysis processor 105 is also configured to receive the multi-channel signals and analyse the signals to produce directional metadata 106 associated with the multi-channel signals and thus associated with the transport signals 104.

The analysis processor 105 may be configured to generate the directional metadata parameters which may comprise, for each time-frequency analysis interval, at least one direction parameter 108 and at least one energy ratio parameter 110 (and in some embodiments other parameters, of which a non-exhaustive list includes number of directions, surround coherence, diffuse-to-total energy ratio, remainder-to-total energy ratio, a spread coherence parameter, and distance parameter). The direction parameter may be represented in any suitable manner, for example as spherical co-ordinates azimuth θ and elevation ϕ. The direction θ, ϕ and direct-to-total energy ratio r parameters may in some embodiments be associated with spread coherence ζ and surround coherence γ parameters. In other words the directional metadata parameters comprise parameters which aim to characterize the sound-field created or captured by the multi-channel signals (or two or more audio signals in general).

In some embodiments the number of the directional metadata parameters may differ from time-frequency tile to time-frequency tile. Thus for example in band X all of the directional metadata parameters are obtained (generated) and transmitted, whereas in band Y only one of the directional metadata parameters is obtained and transmitted, and furthermore in band Z no parameters are obtained or transmitted. A practical example of this may be that for some time-frequency tiles corresponding to the highest frequency band some of the directional metadata parameters are not required for perceptual reasons. The directional metadata 106 may be passed to an encoder 107.

In some embodiments the analysis processor 105 is configured to apply a time-frequency transform for the input signals. Then, for example, in time-frequency tiles when the input is a mobile phone microphone array, the analysis processor could be configured to estimate delay-values between microphone pairs that maximize the inter-microphone correlation. Then based on these delay values the analysis processor may be configured to formulate a corresponding direction value for the directional metadata. Furthermore the analysis processor may be configured to formulate a direct-to-total ratio parameter based on the correlation value.

In some embodiments, for example where the input is a FOA signal, the analysis processor 105 can be configured to determine an intensity vector. The analysis processor may then be configured to determine a direction parameter value for the directional metadata based on the intensity vector. A diffuse-to-total ratio can then be determined, from which a direct-to-total ratio parameter value for the directional metadata can be determined. This analysis method is known in the literature as Directional Audio Coding (DirAC).

In some examples, for example where the input is a HOA signal, the analysis processor 105 can be configured to divide the HOA signal into multiple sectors, in each of which the method above is utilized. This sector-based method is known in the literature as higher order DirAC (HO-DirAC). In these examples, there is more than one simultaneous direction parameter value per time-frequency tile corresponding to the multiple sectors.

Additionally in some embodiments where the input is a loudspeaker surround mix and/or audio object(s) based signal, the analysis processor can be configured to convert the signal into a FOA/HOA signal(s) format and to obtain direction and direct-to-total ratio parameter values as above.

The encoder 107 may comprise an audio encoder core 109 which is configured to receive the transport audio signals 104 and generate a suitable encoding of these audio signals. The encoder 107 can in some embodiments be a computer (running suitable software stored on memory and on at least one processor), or alternatively a specific device utilizing, for example, FPGAs or ASICs. The audio encoding may be implemented using any suitable scheme.

The encoder 107 may furthermore comprise a directional metadata encoder/quantizer 111 which is configured to receive the directional metadata and output an encoded or compressed form of the information. In some embodiments the encoder 107 may further interleave, multiplex to a single data stream or embed the directional metadata within encoded downmix signals before transmission or storage shown in FIG. 1 by the dashed line. The multiplexing may be implemented using any suitable scheme.

In some embodiments the transport signal generator 103 and/or analysis processor 105 may be located on a separate device (or otherwise separate) from the encoder 107. For example in such embodiments the directional metadata (and associated non-directional metadata) parameters associated with the audio signals may be a provided to the encoder as a separate bit-stream.

In some embodiments the transport signal generator 103 and/or analysis processor 105 may be part of the encoder 107, i.e., located inside of the encoder and be on a same device.

In the following description the 'synthesis' part 131 is described as a series of parts however in some embodiments the part may be implemented as functions within the same functional apparatus or part.

In the decoder side, the received or retrieved data (stream) may be received by a decoder/demultiplexer 133. The decoder/demultiplexer 133 may demultiplex the encoded streams and pass the audio encoded stream to a transport signal decoder 135 which is configured to decode the audio signals to obtain the transport audio signals. Similarly the decoder/demultiplexer 133 may comprise a metadata extractor 137 which is configured to receive the encoded directional metadata (for example a direction index representing a direction parameter value) and generate directional metadata.

In some embodiments the decoder/demultiplexer 133 is thus configured to extract the group description parameters G group association matrix $\theta_g$ group azimuths, $\phi_g$ group azimuths, $r_g$ group direct-to-total ratios, $\zeta_g$ group spread coherences, and $\gamma_g$ group surround coherences from the bitstream. The grouped metadata is then converted back to full per TF-tile directional metadata based on a suitable regeneration procedure.

In some embodiments, first, storage for the directional metadata is created in the form of the specified directional metadata format (e.g., 24 bands and 4 time subframes as proposed for metadata-assisted spatial audio, MASA, format). This format corresponds to the size of G. These matrices are θ, ϕ, r, ζ, γ. Next, a following algorithm is performed using the decoded directional metadata.

1. For k=[1, B] and n=[1, N]
   a. $g=G(k,n)$
   b. $\theta(k,n)=\theta_g$
   c. $\phi(k,n)=\phi_g$
   d. $r(k,n)=r_g$
   e. $\zeta(k, n)=\zeta_g$
   f. $\gamma(k, n)=\gamma_g$ That is, the directional metadata parameters are replicated to corresponding TF-tile locations in the directional metadata matrices based on the information in group matrix G. It should be noted that the matrix form is only a convenient representation option for the directional metadata parameters and the corresponding data could be stored in any other form as well.

The decoder/demultiplexer 133 can in some embodiments be a computer (running suitable software stored on memory and on at least one processor), or alternatively a specific device utilizing, for example, FPGAs or ASICs.

The decoded metadata and transport audio signals may be passed to a synthesis processor 139.

The system 100 'synthesis' part 131 further shows a synthesis processor 139 configured to receive the transport audio signal and the directional metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the transport signals and the directional metadata.

The synthesis processor 139 thus creates the output audio signals, e.g., multichannel loudspeaker signals or binaural signals based on any suitable known method. This is not explained here in further detail. However, as a simplified example, the rendering can be performed for loudspeaker output according to any of the following methods. For example the transport audio signals can be divided to direct and ambient streams based on the direct-to-total and diffuse-to-total energy ratios. The direct stream can then be rendered based on the direction parameter(s) using amplitude panning. The ambient stream can furthermore be rendered using decorrelation. The direct and the ambient streams can then be combined.

The output signals can be reproduced using a multichannel loudspeaker setup or headphones which may be head-tracked.

It should be noted that the processing blocks of FIG. 1 can be located in same or different processing entities. For example, in some embodiments, microphone signals from a mobile device are processed with a spatial audio capture system (containing the analysis processor and the transport signal generator), and the resulting spatial metadata and transport audio signals (e.g., in the form of a MASA stream) are forwarded to an encoder (e.g., an IVAS encoder), which contains the encoder. In other embodiments, input signals (e.g., 5.1 channel audio signals) are directly forwarded to an encoder (e.g., an IVAS encoder), which contains the analysis processor, the transport signal generator, and the encoder.

In some embodiments there can be two (or more) input audio signals, where the first audio signal is processed by the apparatus shown in FIG. 1 (resulting in data as an input for the encoder) and the second audio signal is directly forwarded to an encoder (e.g., an IVAS encoder), which contains the analysis processor, the transport signal generator, and the encoder. The audio input signals may then be encoded in the encoder independently or they may, e.g., be combined in the parametric domain according to what may be called, e.g., MASA mixing.

In some embodiments there may be a synthesis part which comprises separate decoder and synthesis processor entities or apparatus, or the synthesis part can comprise a single entity which comprises both the decoder and the synthesis processor. In some embodiments, the decoder block may process in parallel more than one incoming data stream. In the application the term synthesis processor may be interpreted as an internal or external renderer.

Therefore in summary first the system (analysis part) is configured to receive multi-channel audio signals. Then the system (analysis part) is configured to generate a suitable transport audio signal (for example by selecting some of the audio signal channels). The system is then configured to encode for storage/transmission the transport audio signal. After this the system may store/transmit the encoded transport audio signal and metadata. The system may retrieve/receive the encoded transport audio signal and metadata. Then the system is configured to extract the transport audio signal and metadata from encoded transport audio signal and metadata parameters, for example demultiplex and decode the encoded transport audio signal and metadata parameters.

The system (synthesis part) is configured to synthesize an output multi-channel audio signal based on extracted transport audio signal and metadata.

Figure 2:
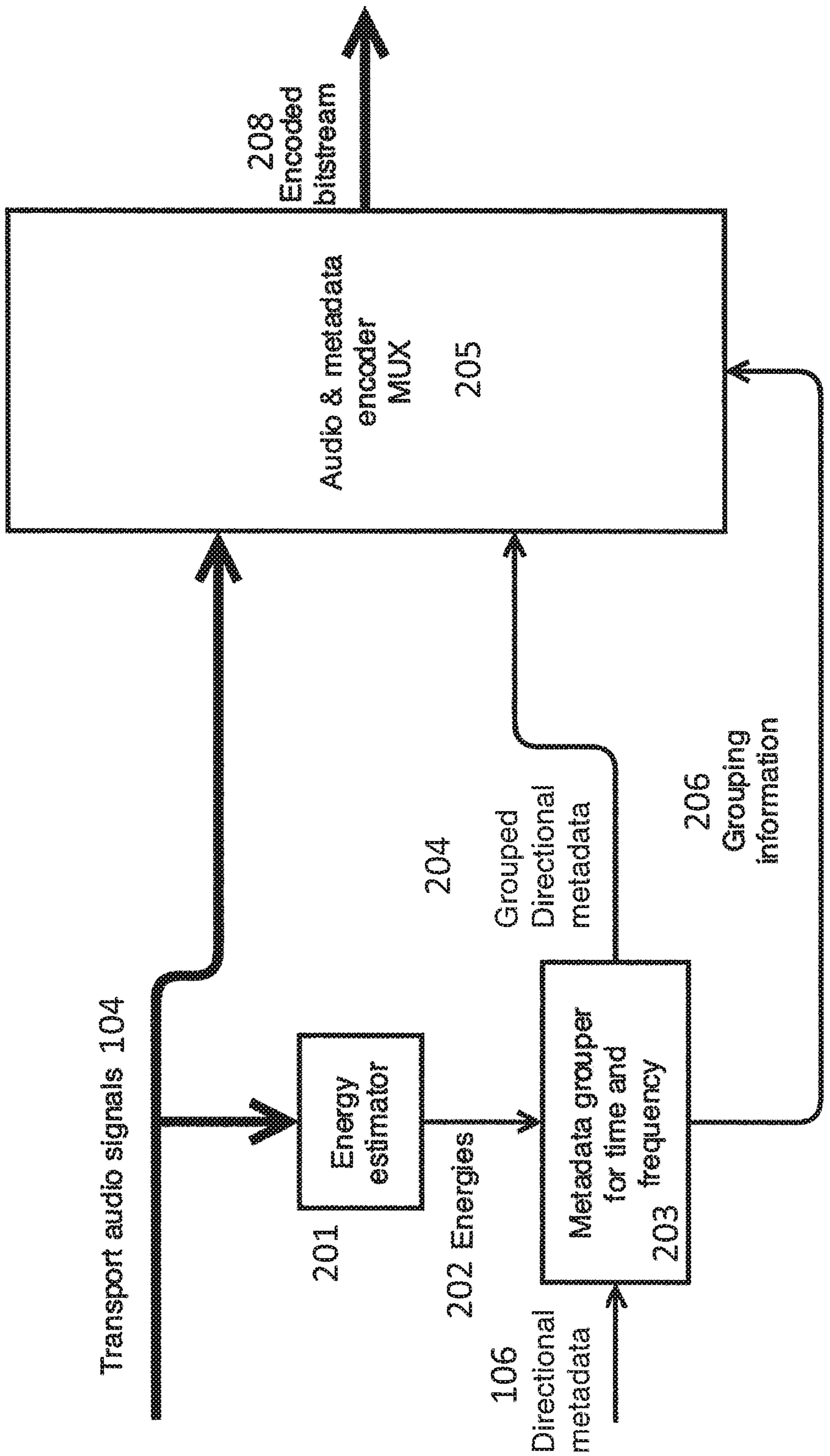
FIG. 2 shows schematically the encoder according to some embodiments.

With respect to FIG. 2 is shown an example encoder specifically showing a spatial metadata grouper arrangement according to some embodiments.

In this example the encoder 107 receives the transport audio signals 104 and the directional metadata 106.

The encoder is shown comprising an energy estimator 201. The energy estimator 201 is configured to receive the transport audio signals 104 and generate suitable energy parameters 202. The energy estimator 201 in some embodiments estimates the energies in time-frequency tiles. First, the transport audio signals 104 are transformed from the time domain to the time-frequency domain. This can be performed, e.g., using short-time Fourier transform (STFT), or, e.g., the complex quadrature mirror filterbank (QMF). The resulting time-frequency domain transport audio signals are denoted as S(i, b, n), where i is the channel index, b is the frequency bin index, and n is the temporal sub-frame index. Then, the energies are estimated using $$E(k, n) = \sum_{i} \sum_{b_{k,low}}^{b_{k,high}} |S(i, b, n)|^2$$

where $b_{k,low}$ is the lowest bin of the band k and $b_{k,high}$ is the highest bin of the band. The time-frequency tiles in some embodiments are arranged such that they match the time-frequency tiles of the input directional metadata. In some embodiments, the energy estimator is configured to obtain precomputed time-frequency energies corresponding to the transport audio signals, for example as a parameter from the directional metadata.

The estimated/obtained energies can then be forwarded to a metadata grouper 203.

In some embodiments the encoder comprises a metadata grouper 203. The metadata grouper 203 is configured to receive the directional metadata 106 and furthermore the estimated/obtained energies 202. Thus, there is a set of directional metadata parameter values for each TF-tile.

The metadata grouper 203 can then be configured to determine or compute a similarity decision matrix. The similarity decision matrix is generated by first computing the direction parameter vectors for each TF-tile with direct-to-total ratio weighting $$x(k, n) = r(k, n)\cos\theta(k, n)\cos\phi(k, n)$$

$$y(k, n) = r(k, n)\sin\theta(k, n)\cos\phi(k, n)$$

-continued $$z(k,n)=r(k,n)\sin\phi(k,n)$$

$$v(k,n)=\begin{bmatrix}x(k,n)\\y(k,n)\\z(k,n)\end{bmatrix}$$

The metadata grouper 203 is then configured to define groups for each TF-tile separately. In the following expressions the equations are formulated using the current frequency band index $k_c$ and current time subframe index $n_c$. A matrix notation is used here where (k, n) define specific matrix elements of the corresponding matrix.

The metadata grouper 203 is thus configured to determine a frequency weighting matrix $W(k_c, n_c)$ for restricting group selection. There are various choices for this, but in some embodiments close bands in frequency are allowed to pass the similarity test. In this example, the following matrix is used.

$$W(k_c,n_c,k,n)=\begin{cases}1, & \text{if } k\in[\max(1,k_c-\beta),\ \min(B,k_c+\beta)]\\0.001, & \text{otherwise}\end{cases}$$

Here B is the total number of frequency bands (for example 24), and β is the bandwidth variable for which an experimentally determined value of 7 can be used. Any other similar weighting matrices can be used as well but this example was found to produce efficient groupings while maintaining the perceptual audio quality at high level.

The current TF-tile direction vector can then be summed term-wise to each weighted TF-tile and a resulting vector length matrix $L(k_c, n_c)$ is formed.

$$L(k_c,n_c,k,n)=\|W(k_c,n_c,k,n)v(k,n)+W(k_c,n_c,k,n)v(k_c,n_c)\|$$

An importance matrix λ can then be formed as follows.

$$\lambda(k_c,n_c,k,n)=r(k,n)+r(k_c,n_c)-L(k_c,n_c,k,n)$$

Each of the matrix values define how similar the other TF-tile (k, n) directional metadata (specifically the direction and direct-to-total ratio) is to the current TF-tile $(k_c, n_c)$ under study. Values close to zero mean similarity and thus redundant information. The terms of this matrix can be compared to a threshold value t to produce similarity decision matrix $\Lambda(k_c, n_c)$.

$$\Lambda(k_c,n_c,k,n)=\begin{cases}1, & \text{when } \lambda(k_c,n_c,k,n)<\tau\\0, & \text{when } \lambda(k_c,n_c,k,n)\geq\tau\end{cases}$$

For the threshold value τ, different values can be used to indirectly control the number of groups. For example, τ=0.1 has been found in testing to provide perceptual transparency (or very close to it) for practical input samples whereas τ=0.5 in the same testing provides a low group count while still preserving close to transparent output.

Note that the similarity measure (including the importance matrix) described above is only a single example method that provides perceptually good results. Any other suitable measure or determined parameter can be used to express a perceptual importance and/or similarity between parameters in TF-tiles is also valid and may be implemented.

Once the matrices have been formed for each TF-tile (i.e., $k_c\in[1, B]$, $n_c\in[1, N]$, where N is the total number of subframes), the metadata grouper 203 is configured to compute or determine the order of the group creation. In this example, groups are created such that groups with the most directionally energetic TF-tiles are formed first. Directive information tends to be perceptually more relevant and this order of group creation ensures that no important directional information is lost accidentally in the process. The order is obtained by calculating directive energy values for each TF-tile $$E_{dir}(k,n)=r(k,n)E(k,n)$$

and sorting the values in descending order of directive energy while obtaining the indices. Any sorting function can be used, and the sorting algorithm may directly give an ordered list of indices to use for accessing the TF-tiles. The obtained indices are stored in a sorted list S of pairs (k, n).

The metadata grouper 203 can then be configured to assign each TF-tile into a group and simplify the groups. This can be implemented using the following algorithm.

| | |
|---|---|
| 1. | Initialize matrix G with size (B, N) to zeros. |
| 2. | Initialize counter g = 0 |
| 3. | For each member in sorted list S starting from the first value, perform the following steps |
| | a. Obtain current frequency band and time subframe (tile) index pair $(k_c, n_c)$ |
| | b. If $G(k_c, n_c) = 0$ (i.e., unassigned to any group) |
| | i. g = g + 1 |
| | ii. For all (k,n), if $\Lambda(k_c, n_c, k, n) = 1$ then G(k, n) = g |
| 4. | Set $g_{max} = g$ |
| 5. | Set g = 1 |
| 6. | While g < $g_{max}$ perform following steps |
| | a. If $G(k, n) \neq g$, $\forall k \in [1, B]$, $\forall n \in [1, N]$ |
| | i. When G(k, n) > g then G(k, n) = G(k, n) − 1 |
| | ii. $g_{max} = g_{max} - 1$ |
| | b. Else |
| | i. g = g + 1 |
| 7. | Output final matrix G |

The operations 4-6 in the above algorithm remove empty groups possibly created by algorithm if, e.g., weighting is not symmetrical. These operations may be optional (in other words not required if the grouping algorithm does not create empty groups).

With the simplified groups defined, the metadata grouper 203 is configured to determine combined directional metadata for each simplified group. An example procedure (derived from the methods presented in UKIPO patent applications 1919130.3 and 1919131.1) that has been experimentally tested to produce perceptually high quality is described hereafter but any other suitable method to generate combined parameter values can be implemented in other embodiments.

The directional parameter values may be computed using the following example procedure for each group g.

First, the metadata grouper 203 is configured to obtain the group sum vector $$v_g=\sum_{k=1}^{B}\sum_{n=1}^{N}v(k,n)E(k,n)\Lambda_g(k,n)$$

where N is the total number of subframes, g is the group index, and the group similarity matrix is $$\Lambda_g(k,n)=\begin{cases}1, & \text{when } G(k,n)=g\\0, & \text{otherwise}\end{cases}$$

and the weighted group direction vector is $$v_g = \begin{bmatrix} x_g \\ y_g \\ z_g \end{bmatrix}$$

Using the group sum vector, the metadata grouper 203 obtains the azimuth and elevation for the group with $$\theta_g = \operatorname{atan}\frac{y_g}{x_g}$$

$$\phi_g = \operatorname{atan}\frac{z_g}{\sqrt{x_g^2 + y_g^2}}$$

The metadata grouper 203 is, in some embodiments, configured to obtain a combined direct-to-total ratio with a following example two-step approach.

First, the ratios are combined through frequency using the following approach $$v_{gt}(n) = \sum_{k=1}^{B} v(k, n)E(k, n)\Lambda_g(k, n)$$

$$r_{gt}(n) = \frac{\|v_{gt}(n)\|}{\sum_{k=1}^{B}\sum_{n=1}^{N} E(k, n)\Lambda_g(k, n)}$$

Then, the frequency-combined ratios are combined in time with $$r_g = \frac{\sum_{n=1}^{N}\left[r_{gt}(n)\sum_{k=1}^{B} E(k, n)\Lambda_g(k, n)\right]}{\sum_{k=1}^{B}\sum_{n=1}^{N} E(k, n)\Lambda_g(k, n)}$$

The metadata grouper 203 also in some embodiments is configured to determine a combined spread coherence and surround coherence parameters with energy-weighted averages. For example.

$$\zeta_g = \frac{\sum_{k=1}^{B}\sum_{n=1}^{N} \zeta(k, n)E(k, n)\Lambda_g(k, n)}{\sum_{k=1}^{B}\sum_{n=1}^{N} E(k, n)\Lambda_g(k, n)}$$

$$\gamma_g = \frac{\sum_{k=1}^{B}\sum_{n=1}^{N} \gamma(k, n)E(k, n)\Lambda_g(k, n)}{\sum_{k=1}^{B}\sum_{n=1}^{N} E(k, n)\Lambda_g(k, n)}$$

Having determined the combined directional metadata parameters for each group the metadata grouper 203 is configured to check whether there are any groups where the reduced directional metadata parameters are substantially similar (identical or almost identical). This can be done by first creating non-weighted group direction vectors $$x_g = \cos\theta_g \cos\phi_g$$

$$y_g = \sin\theta_g \cos\phi_g$$

$$z_g = \sin\phi_g$$

and then checking if all of the following conditions are true $$|x_{g1} - x_{g2}| < \mu$$

$$|y_{g1} - y_{g2}| < \mu$$

$$|z_{g1} - z_{g2}| < \mu$$

$$|r_{g1} - r_{g2}| < \mu$$

$$|\zeta_{g1} - \zeta_{g2}| < \mu$$

$$|\gamma_{g1} - \gamma_{g2}| < \mu$$

where g1 and g2 are the indices of the two compared groups and μ is the similarity threshold. In some embodiments the similarity threshold can have a value of 0.02.

Where there are at least two groups where all of the conditions are true, then the two groups can be joined into a single group with shared directional metadata values. As there is some tolerance in values, new combined values should be computed. A simple solution is to determine or compute again energy-weighted averages between group directional parameter values. For a lower complexity alternative, the metadata grouper 203 is configured to compare the direct-to-total ratios and the directional metadata parameters from the group with the higher value is selected and used.

When all of the similar groups are identified and combined (or there is determined that there are no similar groups) then the group information and reduced directional metadata parameters can be output to the metadata encoder and multiplexer.

Figure 3:
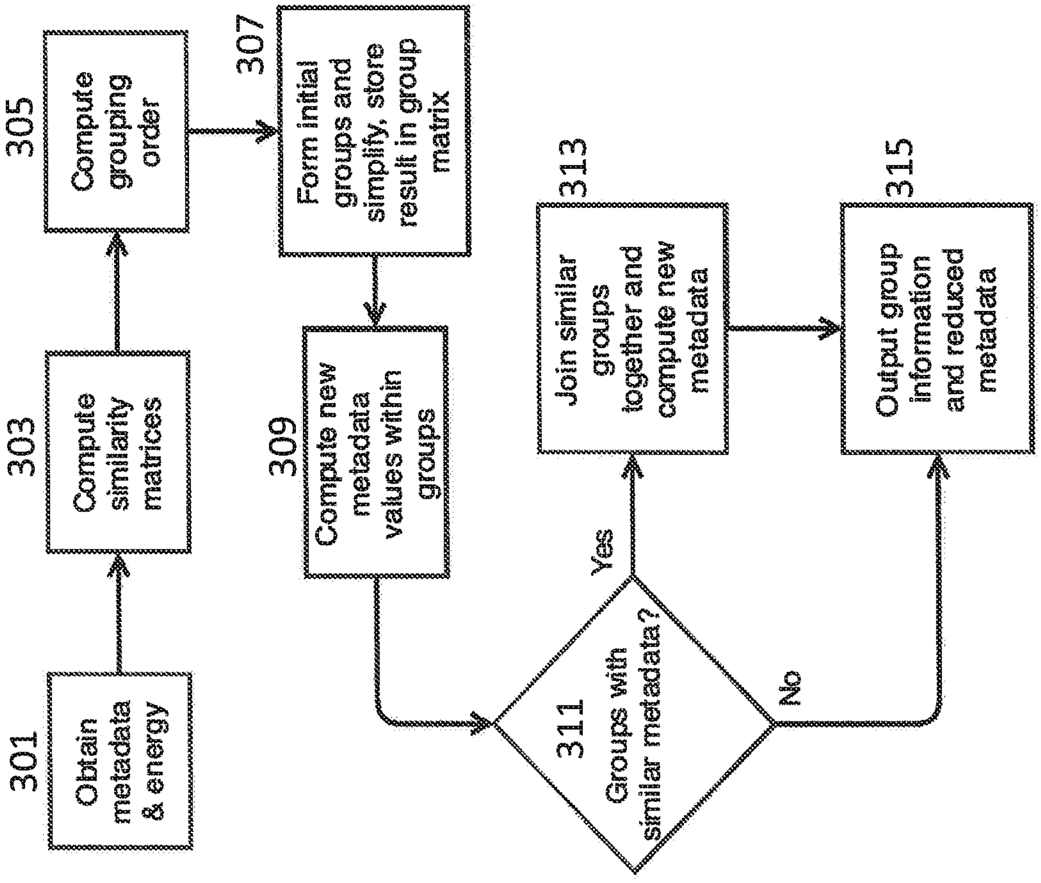
FIG. 3 show a flow diagram of the operations of the spatial metadata grouper arrangement suitable for implementing within the apparatus shown in FIG. 2 according to some embodiments.

With respect to FIG. 3 is shown a summary of the operations as discussed above.

The obtaining of the directional metadata parameters values and the energy values (from the energy estimator described above) for one frame of audio in TF-domain is shown in FIG. 3 by step 301.

The determination of the similarity decision matrix is shown in FIG. 3 by step 303.

The operation of computing the grouping order is shown in FIG. 3 by step 305.

The generation or determination of simplified groups from the initial groups is shown in FIG. 3 by step 307.

The operation of determining combined directional metadata parameter values (new directional metadata parameter values within the groups) is shown in FIG. 3 by step 309.

The operation of checking whether there are any groups with similar directional metadata parameter values is shown in FIG. 3 by step 311.

The joining of the similar groups and the determination of new directional metadata parameter values representing the combined groups is shown in FIG. 3 by step 313.

The group information and reduced directional metadata parameter values may then be output as shown in FIG. 3 by step 315.

In some embodiments the threshold u is configured to be dependent on other parameters. For example, accuracy of direction can be related to the direct-to-total ratio values.

In some embodiments in order to control the performance of the grouping of similar groups, the parameters τ, W, and μ can be modified. In such a manner the method can be relatively easy parameterized and the level of metadata reduction set and controlled (for example based on a determined or estimated available bitrate or storage.)

As the raw amount of grouping data is relatively large when considering low bitrates (such as those mandated for 3GPP IVAS) the metadata grouper 203 can be configured to vary the maximum group count from frame to frame and thus vary the parameter τ. With a value τ=0.1 and using a representative set of input samples, a maximum group count may be limited to 18. The group count itself varies frame by frame between 1 and the maximum.

It is reasonable to expect that one possible solution to signal group information would require $BNb_{gmax}$ bits to use for signalling the group data, where B is the number of frequency bands, N the number of sub-frames, and $b_{gmax}$ is the bits required to encode the index of the group (e.g., 16 possible groups in maximum equals $b_{gmax}=4$). Using suitable values for these parameters (B=24, N=4, $b_{gmax}=4$) would result in 384 bits per frame just for signalling the group information. This is not significant when compared to the raw metadata bitrate but it is significant when compared to an example target metadata bitrate of 8 kb/s which results in just 160 bits per each 20-ms frame. Moreover, the above example would also need the bitrate for the actual metadata parameters (one set for each group) which experimentally has been found to be typically around 23 bits per group resulting at most in 368 bits for the above example values.

It is therefore valid to send this full grouping information when the available bitrate is large enough as it provides a greatly compressed representation of all of the directional metadata parameter values. However, in some embodiments the group information is compressed to reduce the signalling rate of the group information. The metadata grouper 203 can in some embodiments first restrict or limit the data to at most 8 groups (or any other suitable number of groups, 8 groups having been experimentally shown to be reasonable value for some input material) by running the system with multiple values of τ. Then, the metadata grouper 203 is configured to down-sample the group information with a scheme based on the number of groups. Thus if there are fewer groups, more precision can be given to the group resolution.

This scheme thus matches the grouping information to a few different possible templates and selects the one producing least error. An example, of such template is a simple "down-sample" of 24-by-4 matrix to 12-by-2 matrix (i.e., reduction by 2 in both dimensions) and selecting the dominant (for example, by group indication count or by ratio*energy) group for the down-sampled tile. Another example would be a 5-by-2 matrix with frequency axis being based on the human hearing acuity. Best schemes for different bitrates and group counts can be created beforehand by studying a representative set of data. In other words in some embodiments the metadata grouper 203 is pre-trained or pre-set as to a suitable bitrate and group count based on suitable training audio signals.

In some embodiments the metadata grouper 203 for the above target of 160 bits per frame, can be designed such that the group information metadata takes at most 80 bits to signal, and the rest of the bitrate is used to signal the group directional metadata parameter values. From previous experiments, it is known that for target bitrate of 160 bits per frame, it is possible to obtain good quality with just approximately 11 bits per directional metadata group resulting in a total of approximately 90 bits per frame. This for 8 groups is over the set limit but in some embodiments the least important groups can use fewer bits in order to achieve the total limit. On the other hand, when the group count is lower, then bits are freed from describing the group information to describing the directional metadata parameters more accurately.

In some embodiments where the directional metadata parameters contain two direction components per tile then directional metadata grouping may be implemented firstly on a direction by direction basis. For example with respect to FIG. 4 is shown a suitable apparatus for implementing grouping for directional metadata comprising two or more direction values per tile.

Figure 4:
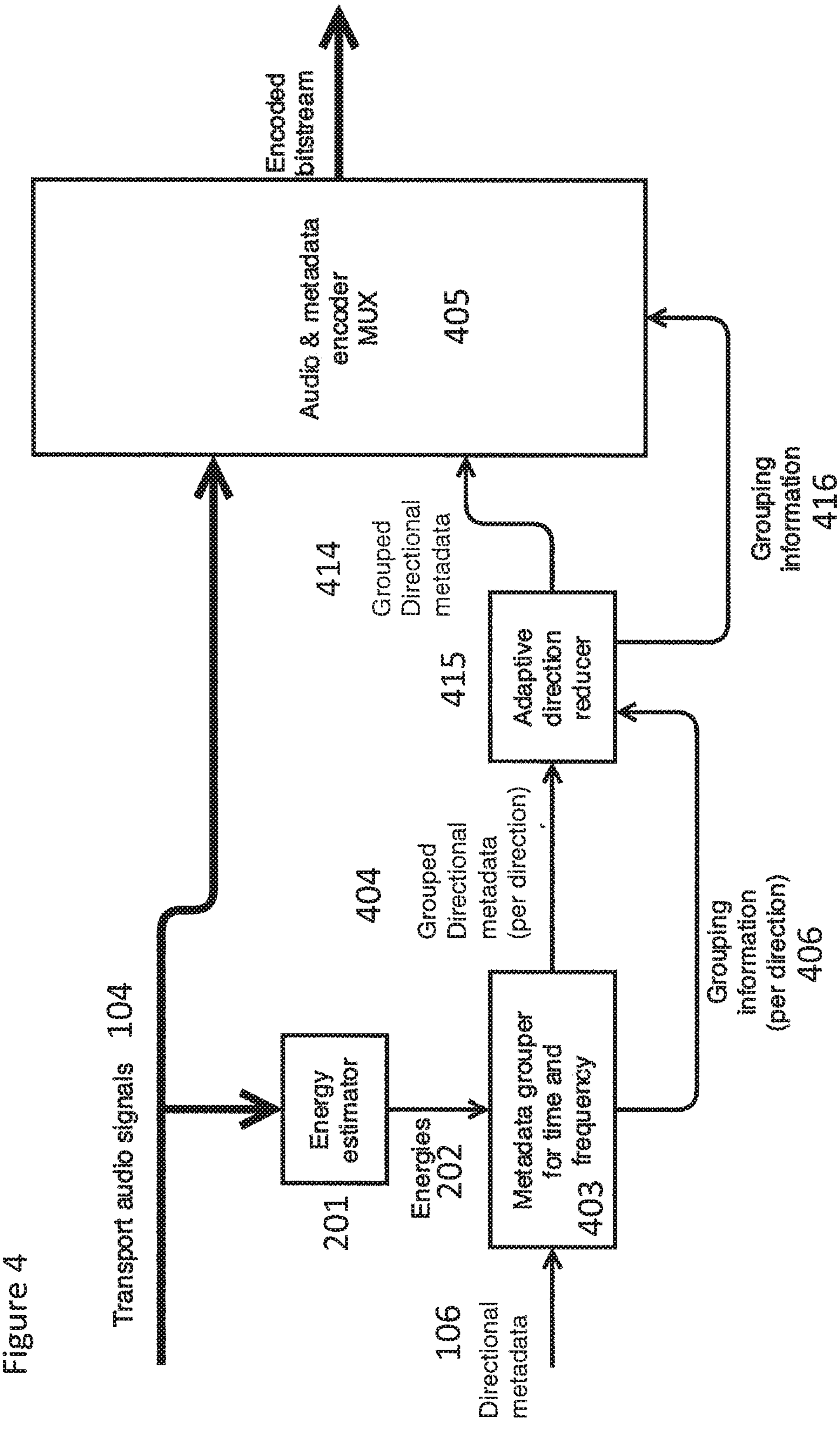
FIG. 4 shows schematically the encoder with time-frequency grouping and separate directional metadata combiner according to some embodiments.

FIG. 4 shows a metadata grouper 403 which is configured to determine for each direction grouping information 406 and also the group directional metadata 404. In other words the metadata grouper 403 is configured to operate as multiple metadata groupers as shown in FIG. 2 but where each of the metadata groupers 203 are grouping metadata for one of the directions.

The grouping information 406 and also the group spatial metadata 404 associated with each direction can then be passed to an adaptive direction reducer 415. The adaptive direction reducer 415 can be configured to compare for joined TF tiles whether to join direction groups. In this case, the groups of directional metadata parameters in multiple directions may use non-overlapping groups before direction joining. When directions are deemed to be joined, then the groups are modified accordingly. The adaptive direction reducer 415 may thus generate group directional metadata 414 and grouping information 416 which is passed to the metadata encoder/multiplexer 405 which performs any suitable directional metadata encoding/multiplexing.

Figure 5:
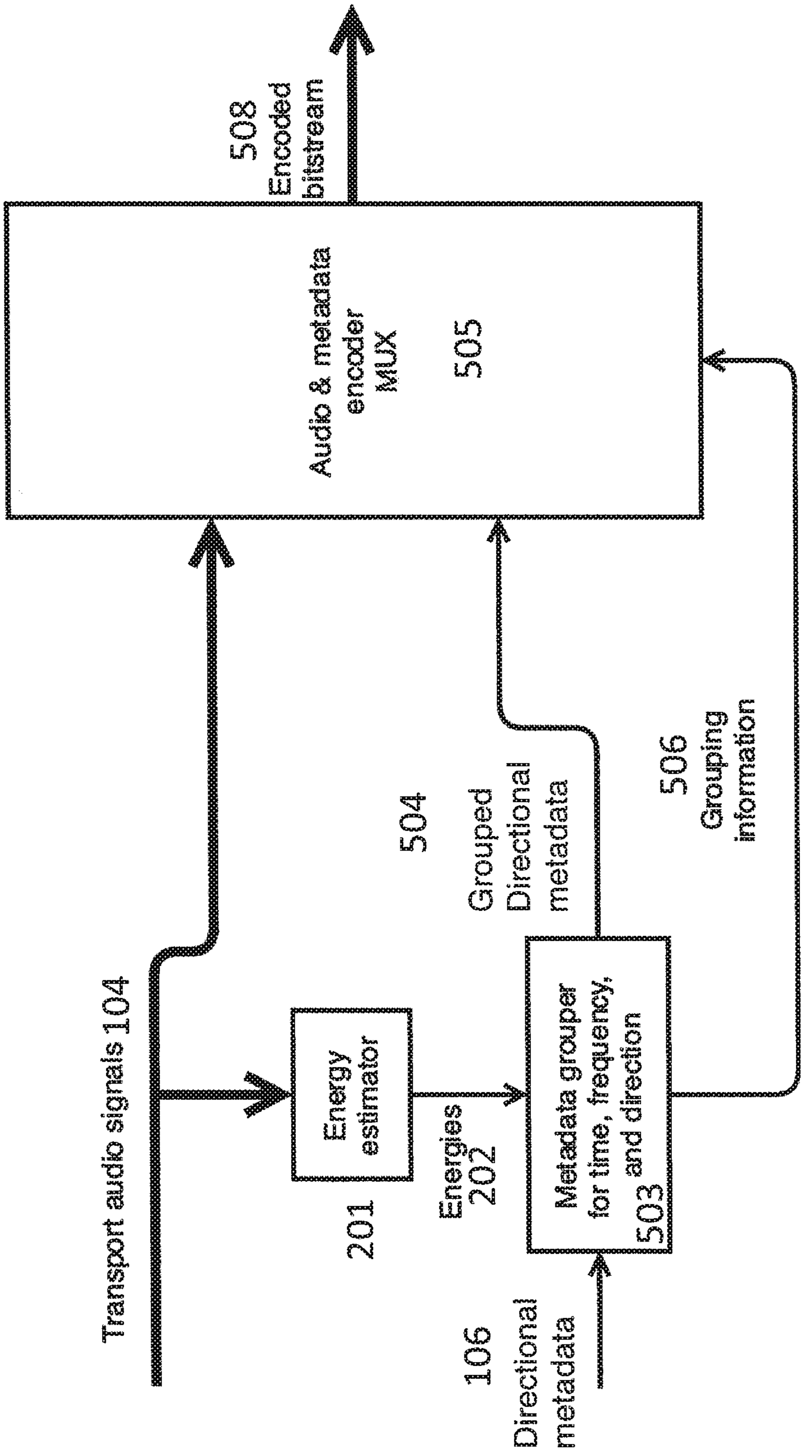
FIG. 5 shows schematically the encoder with full grouping of time, frequency and directional metadata components according to some embodiments.

In some embodiments rather than performing separate time-frequency grouping and direction grouping operations (such as shown by the apparatus in FIG. 4) then the grouping of time-frequency and directions is performed at the same time. This is shown in FIG. 5. In FIG. 5 a metadata grouper (for time, frequency and direction) 503 is configured to receive the energies 202 from the energy estimator 201 and the directional metadata 106 and generate suitable group directional metadata 504 and grouping information 506 which is passed to the audio and metadata encoder/multiplexer 505.

In some embodiments this combined grouping operation may add multiple directional parameters per TF-tile to the implementations described above as shown in FIGS. 2 and 3. The corresponding group creation equations can thus in some embodiments be as follows:

$$x(k,n,d)=r(k,n,d)\cos\theta(k,n,d)\cos\phi(k,n,d)$$

$$y(k,n,d)=r(k,n,d)\sin\theta(k,n,d)\cos\phi(k,n,d)$$

$$z(k,n,d)=r(k,n,d)\sin\phi(k,n,d)$$

$$v(k,n,d)=\begin{bmatrix}x(k,n,d)\\y(k,n,d)\\z(k,n,d)\end{bmatrix}$$

$$W(k_c,n_c,d_c,k,n,d)=\begin{cases}1, & \text{if } k\in[\max(1,\ k_c-\beta),\ \min(B,\ k_c+\beta)]\\0.001, & \text{otherwise}\end{cases}$$

$$L(k_c,n_c,d_c,k,n,d)=\|W(k_c,n_c,d_c,k,n,d)v(k,n,d)+v(k_c,n_c,d_c)\|$$

$$\lambda(k_c,n_c,d_c,k,n,d)=r(k,n,d)+r(k_c,n_c,d_c)-L(k_c,n_c,d_c,k,n,d)$$

$$\Lambda(k_c,n_c,d_c,k,n,d)=\begin{cases}1, & \text{when } \lambda(k_c,n_c,d_c,k,n,d)<\tau\\0, & \text{when } \lambda(k_c,n_c,d_c,k,n,d)\geq\tau\end{cases}$$

Here, d and $d_c$ are respectively the direction index and the current direction index.

The metadata grouper (for time, frequency and direction) 503 can be configured to combine within groups in any suitable order. For example, in some embodiments the metadata grouper (for time, frequency and direction) 503 is configured to first combine in frequency and then in time (as shown in with respect to the embodiments described above) and add the direction combination as the final step. Combination of parameters in direction axis can be done with energy-weighted average or with any other suitable method.

It is noted that addition of the third dimension for the metadata increases also the amount of grouping information and requires further tuning of the signalling of the grouping information in order to reduce the data.

Figure 6:
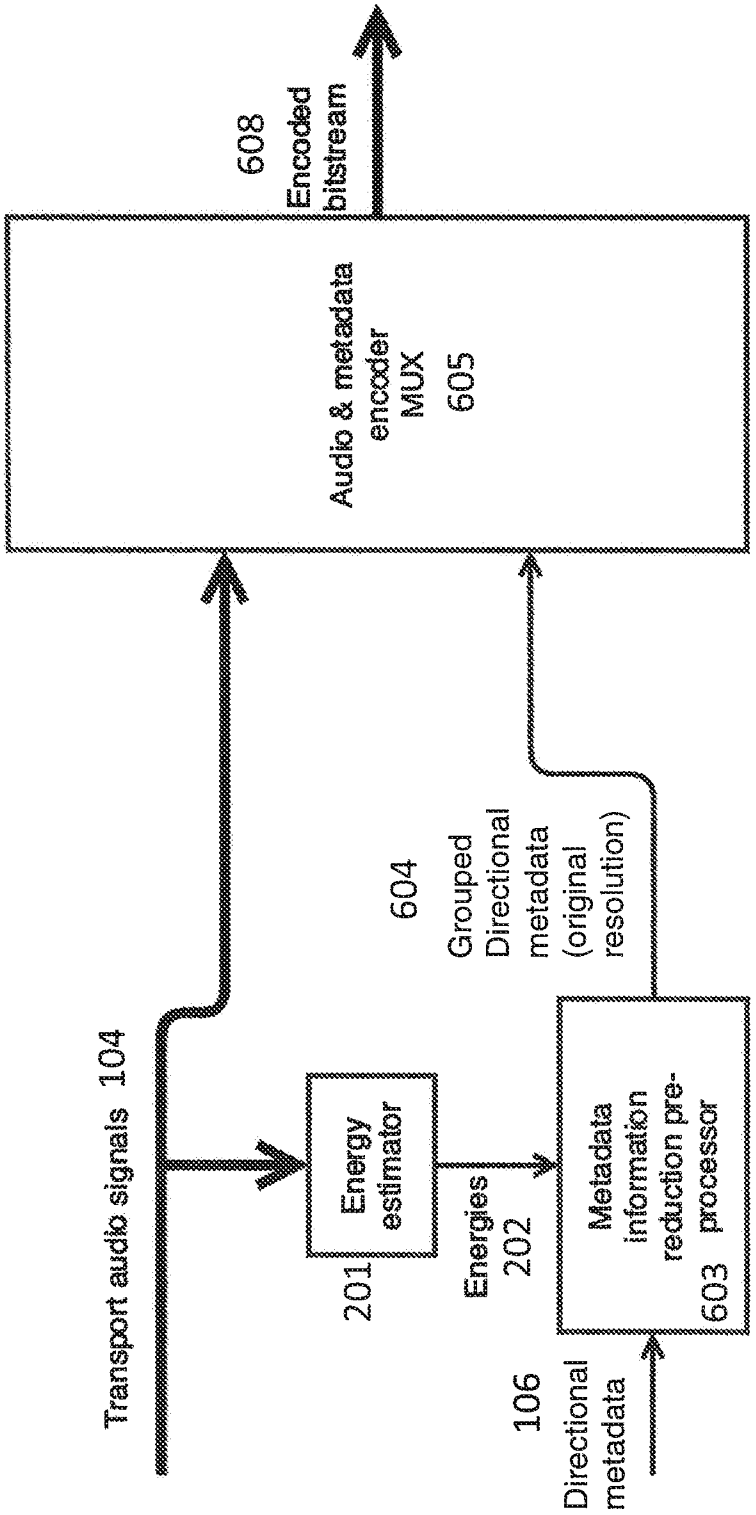
FIG. 6 shows schematically the encoder with a pre-processing reduction according to some embodiments.

With respect to FIG. 6 is shown a further encoder where metadata information is reduced as a pre-processing operation. Thus a metadata information reduction pre-processor 603 is configured to receive the energies 202 from the energy estimator 201 and the directional metadata 106 and generate directional metadata 604 which is passed to the audio and metadata encoder/multiplexer 605.

The spatial metadata in such embodiments is combined in detected groups, but group information is not passed forward and metadata is passed in the original resolution as modified with a reduced information. In these embodiments the operations as discussed above are implemented but instead of passing group-based directional metadata parameter values and the group information for further encoding, the group-based directional metadata parameter values are stored in the positions defined by the group information in the full frame-sized metadata matrices. With these embodiments, a lossy (but perceptually lossless) reduction of information can be achieved which in turn results in simpler and more efficient further compression of the directional metadata parameter values.

Figure 7:
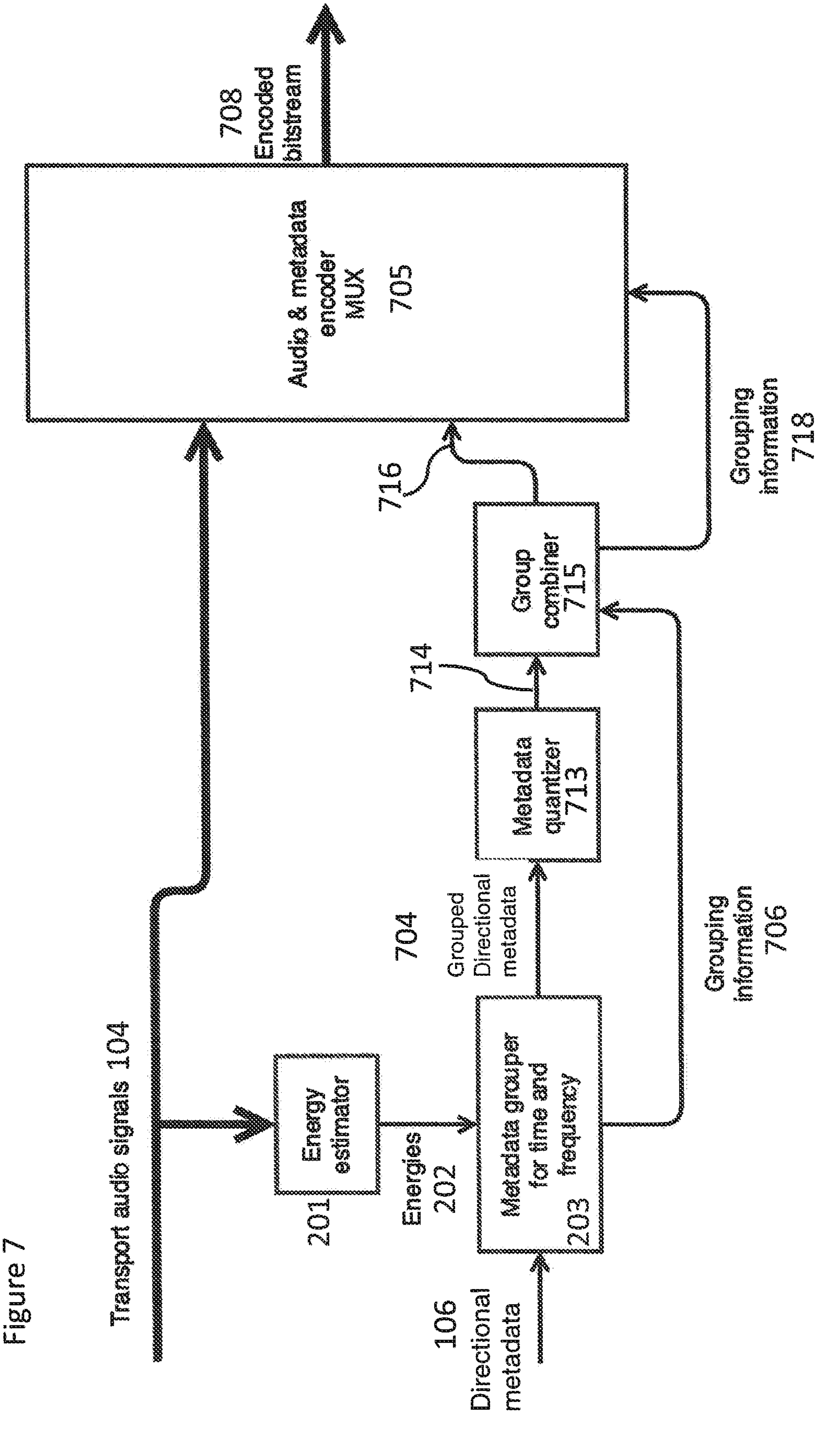
FIG. 7 shows schematically the encoder with a metadata quantizer according to some embodiments.

With respect to FIG. 7 is shown a further encoder where grouping includes metadata quantization. The quantization thus allows further joining of groups. Thus a metadata grouper 203 (for time and frequency) is configured to receive the energies 202 from the energy estimator 201 and the directional metadata 106 and generate group directional metadata 704 which is passed to a metadata quantizer 713 and grouping information 706 to a group combiner 715.

The metadata quantizer 713 is configured to receive the group directional metadata 704 and quantize after the initial grouping. The metadata quantizer 713 output 714 can be then fed to the group combiner 715 which is configured to identify any quantized identical groups to detect if quantization has produced identical groups and then combine the identical quantized groups. In some embodiments this may be implemented as an iterative system that quantizes and joins groups in gradual steps until desired bitrate is achieved.

The group combiner 715 then outputs the quantized grouped directional metadata 716 and the grouping information 718 which is passed to the encoder 705.

Figure 8:
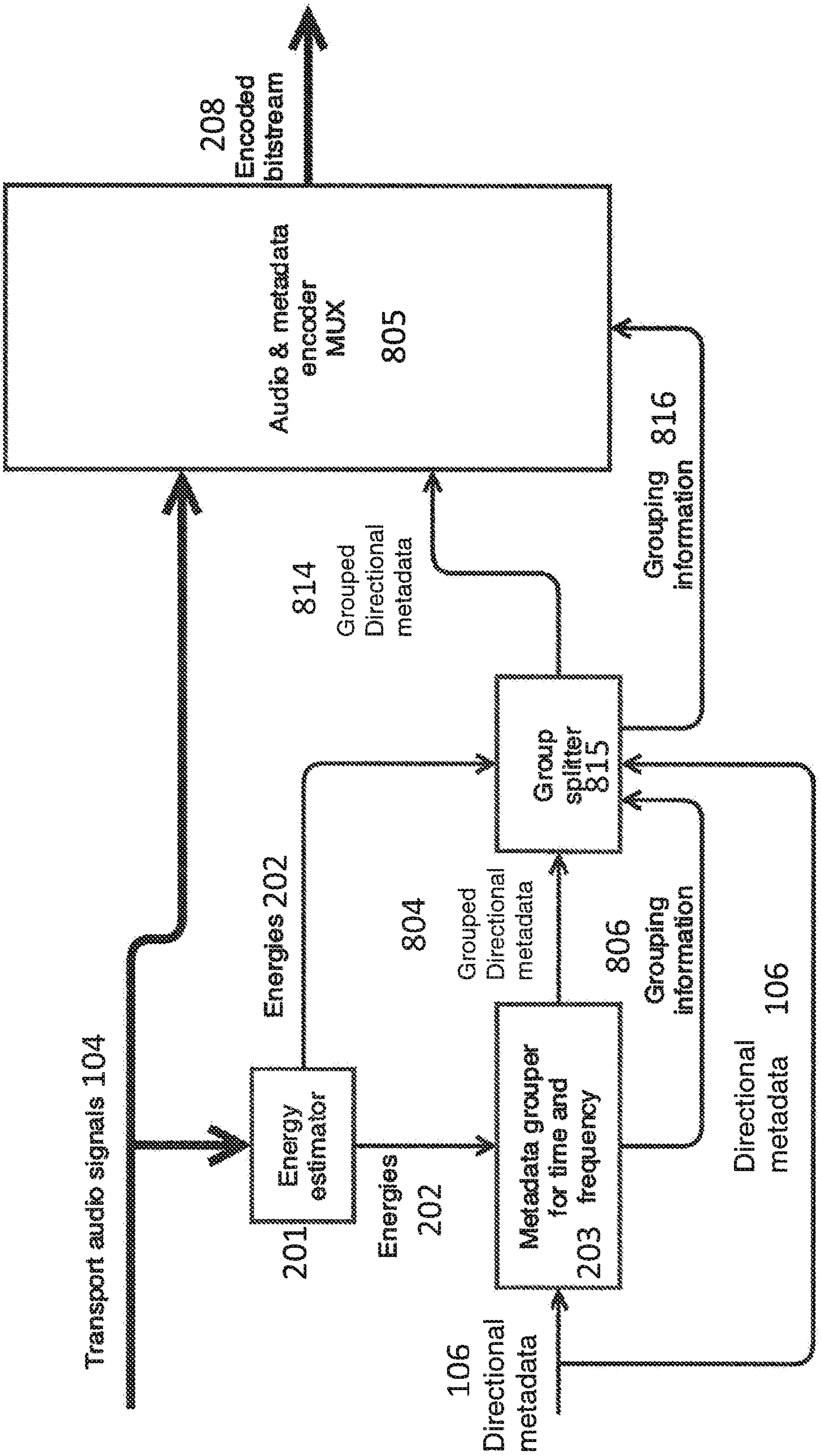
FIG. 8 shows schematically the encoder with a group splitter according to some embodiments.

With respect to FIG. 8 is shown a further encoder where a further splitter is added to increase the number of groups where the bitrate allows. The metadata grouper 203 (for time and frequency) is configured to receive the energies 202 from the energy estimator 201 and the directional metadata 106 and generate group spatial metadata 804 and grouping information 806 to a group splitter 815.

The group splitter 815 is configured to receive the group directional metadata 804 and grouping information 806 and furthermore energies 202 from the energy estimator 201 and the directional metadata 106 and identify whether the number of groups can be or needs to be split. This approach is beneficial when there is more bitrate available or metadata error is too large for a specific parameter. A simple and efficient example approach to split the groups is to select a group to split (e.g., by detecting large parameter error) and then create two new groups from it by dividing the group members based on one or multiple parameters inside the group. The split group directional metadata 814 and the split grouping information 816 are passed to the audio and metadata encoder multiplexer 805.

As an example, the spread coherence parameter can be used as the dividing parameter such that if the original spread coherence value for the tile is below the mean spread coherence value within the group, then the TF-tile is designated to be part of the new group. Otherwise, the TF-tile is left into the original group. After splitting, the combined directional metadata parameter values are calculated again within the split groups. This method results in the two groups producing more accurate representation for the specific selected parameter-spread coherence in this case.

In the embodiments as discussed above the proposed grouping system studies first order relation between weighted direction vectors when grouping the metadata and assumes that this will provide reasonable groups of similar data. It has been shown experimentally to work very well, but it is also possible to calculate vector sums further in chain to and through this, combine all the similar vectors that do not change the vector direction or reduce the vector length too much. However such an implementation would require significantly more computation.

In some embodiments other example weighting (energy, direct-to-total ratio, etc.) methods can be implemented.

In some embodiments the apparatus is configured to implement further group joining steps in addition to the ones provided here. For example, TF-tile energy can be computed or evaluated and low energy tiles can be joined or moved to the most convenient group (e.g., neighbouring one to enable easier compression).

Figure 9:
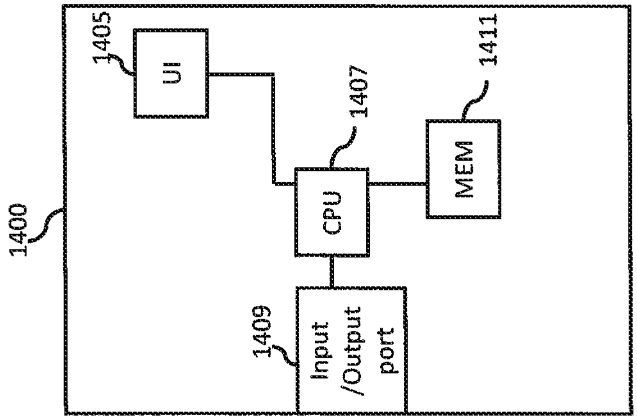
FIG. 9 shows schematically an example device suitable for implementing the apparatus shown.

With respect to FIG. 9 an example electronic device which may be used as the analysis or synthesis device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus, for spatial audio encoding, comprising at least one processor and at least one memory including computer program code, the at least one memory and the computer program code configured to, with the at least one processor, cause the apparatus to:

obtain at least one first parameter value comprising a direction and a direct-to-total ratio for a first time-frequency tile of at least one audio signal and at least one second parameter value comprising a direction and a direct-to-total ratio for a second time-frequency tile of the at least one audio signal;

obtain a similarity value from an entry of a similarity decision matrix, wherein the similarity value is a flag indicating a similarity between the direction and the direct-to-total ratio for the first time-frequency tile and the direction and the direct-to-total ratio for the second time-frequency tile;

form at least one group of time-frequency tiles comprising the first time-frequency tile and the second time-frequency tile by determining an ordered list of time-frequency tiles from which the at least one group of time-frequency tiles is selected, wherein the ordered list of time-frequency tiles (i) determines the order by which the time-frequency tiles are grouped, (ii) comprises the first and second time-frequency tiles, and (iii) is based on a descending order of directive energy of the time-frequency tiles, and wherein the at least one group of time-frequency tiles is formed based on the similarity value; and generate for the at least one group of time-frequency tiles at least one group parameter value based on the at least one first parameter value and the at least one second parameter value.

2. The apparatus as claimed in claim 1, wherein the similarity value is determined by:

determining a first weighted direction vector from the direction for the first time-frequency tile and determining a second weighted direction vector from the direction for the second time-frequency tile;

determining a vector length from the first weighted vector and the second weighted vector;

determining an importance value from the vector length; and determining the similarity value based on a comparison between the importance value and a threshold.

3. The apparatus as claimed in claim 1, wherein the first weighted direction vector and the second weighted direction vector are frequency weighted for restricting group selection such that the at least one group contains time-frequency tiles that are within a defined frequency band distance.

4. The apparatus as claimed in claim 1, wherein the at least one group comprises at least two groups and the apparatus is further caused to combine at least two of the groups of time-frequency tiles based on the associated group parameters being substantially similar.

5. The apparatus as claimed in claim 1, wherein the apparatus is further caused to generate at least one indicator configured to identify group members of the at least one group.

6. The apparatus as claimed in claim 1, wherein the at least one first parameter value and the at least one second parameter value further comprise at least one of:

at least one spread coherence associated with at least one direction value;

at least one distance associated with at least one direction value;

at least one surround coherence;

at least one diffuse-to-total ratio; and at least one remainder-to-total ratio.

7. A method for spatial audio encoding, the method comprising:

obtaining at least one first parameter value comprising a direction and a direct-to-total ratio for a first time-frequency tile of at least one audio signal and at least one second parameter value comprising a direction and a direct-to-total ratio for a second time-frequency tile of the at least one audio signal;

obtaining a similarity value from an entry of a similarity decision, wherein the similarity value is a flag indicating a similarity between the direction and the direct-to-total ratio for the first time-frequency tile and the direction and the direct-to-total ratio for the second time-frequency tile;

forming at least one group of time-frequency tiles comprising the first time-frequency tile and the second time-frequency tile by determining an ordered list of time-frequency tiles from which the at least one group of time-frequency tiles is selected, wherein the ordered list of time-frequency tiles (i) determines the order by which the time-frequency tiles are grouped, (ii) comprises the first and second time-frequency tiles, and (iii) is based on a descending order of directive energy of the time-frequency tiles, and wherein the at least one group of time-frequency tiles is formed based on the similarity value; and generating for the at least one group of time-frequency tiles at least one group parameter value based on the at least one first parameter value and the at least one second parameter value.

* * * * *